United States Patent

Dawes

Patent Number: 6,084,860
Date of Patent: Jul. 4, 2000

[54] METHOD FOR DETERMINING THE DROP RATE, THE TRANSIT DELAY AND THE BREAK STATE OF COMMUNICATIONS OBJECTS

[75] Inventor: Nicholas W. Dawes, Ottawa, Canada

[73] Assignee: Loran Network Management Ltd., Bridgetown, Barbados

[21] Appl. No.: 09/014,687

[22] Filed: Jan. 28, 1998

[30] Foreign Application Priority Data

Jan. 28, 1997 [CA] Canada ................................. 2196133

[51] Int. Cl.⁷ ................................................ G01R 31/08
[52] U.S. Cl. ........................................ 370/252; 370/253
[58] Field of Search .................................. 370/241, 252, 370/253, 248, 250, 249

[56] References Cited

U.S. PATENT DOCUMENTS 5,559,955  9/1996  Dev et al. .
5,668,800  9/1997  Stevenson ........................ 370/250
5,933,416  8/1999  Schenkel et al. .................. 370/254

FOREIGN PATENT DOCUMENTS

93/10495  of 1993  WIPO .

OTHER PUBLICATIONS

N. Dawes Et. Al., Network Diagnosis by Reasoning in Uncertain Nested Evidence Spaces, IEEE Transaction on Communication, vol. 43, N. 2/3/4, pp. 466–476, Apr. 1995.
"Performance evaluation of PC routers using a single–server multi–queue system with a reflection technique"; A. Jirachiefpattana et al., Computer Communications, vol. 1, No. 20, pp. 1–10, Jan. 1997.

"Structure and use of signalling in B–ISDNs"; R.O. Onvural et al, Computer Networks and ISDN Systems, vol. 3, pp. 307–323, 1996.
"Fuzzy Routing"; W. Arnold et al., Fuzzy Sets and Systems, vol. 2, pp. 131–153; Jan. 23, 1997.
"Dyanmic QoS Control of Multimedia Applications Based on RTP", Busse et al. vol. 1, pp. 49–58, 1966.

*Primary Examiner*—Michael Horabik
*Assistant Examiner*—Prenell Jones
*Attorney, Agent, or Firm*—Pascal & Associates

[57] ABSTRACT

A method of analyzing a communication network that determines a mean drop rate in a device x by polling each device from a network management computer (NMC) which is in communication with the network, and processing signals in the NMC to determine a drop rate D(x), in accordance with:

$$D(x)=((L+(x)-L-(x))/2,$$

and $L(x)=1-A(x)$ where
- A(x): the fraction of poll requests from the NMC to device x for which the NMC receives replies (measured over the last M sampling periods), (wherein x must not be broken),
- D(x): the mean frame drop rate in device x,
- L(c): NMC's perception of the loss rate to device x and back,
- L–(x): the NMC's perception of the mean value of L(z) for all devices z connected to device x, closer to the NMC than device x and which are not broken, and
- L+(x): the NMC's perception of the mean value of L(z) for all devices z connected to device x, further away from the NMC than device x and which are not broken.

3 Claims, 1 Drawing Sheet

METHOD FOR DETERMINING THE DROP RATE, THE TRANSIT DELAY AND THE BREAK STATE OF COMMUNICATIONS OBJECTS

FIELD OF THE INVENTION

This method determines the drop rate, the transit delay and the break state of communications objects using the topology (connectivity) of these objects.

BACKGROUND TO THE INVENTION

Existing methods for determining whether or not a communications device is broken depend on periodically sending frames to it which require the device to respond (e.g. SNMP requests and responses (RFC 1157)). The absence of any response to a sequence of requests indicates the device is either broken or that the communications path to the device is broken. The best method for exploiting this information using knowledge of the network topology is reported by Dawes et al (Network Diagnosis by Reasoning in Uncertain Nested Evidence Spaces: N. W. Dawes, J. Altoft, B. Pagurek: IEEE Transactions on Communications, #2, 43, pp 466–476, 1995). This earlier method does not exploit measurements of the traffic rates on lines connected to devices and so is far more complex and far later to detect break faults than the method described below. It also is marginally less accurate. Commercially deployed break fault methods are very significantly inferior to even this previous method.

Existing methods for determining the transit delay across a device rely on requesting this information from the device itself, in the case where the device measures this delay and records it so it can be read externally. However, many devices do not have these facilities. Many of those that do, do so in a manner which is particular to that version of that manufacturer's device, placing the information in certain variables somewhere in the MIB (RFC 1213). This makes the process of determining the transit delay across a device cumbersome and complex, as variation need to be made for the particular device type.

Existing methods for determining the drop rate of a device depend on what percentage of responses it makes to management requests. They do not use knowledge of the local topology of objects and so are far less accurate than the present invention.

SUMMARY OF THE INVENTION

A method of determining the topology of a network of objects has been filed for patent, Dawes et al, U.S. Ser. No. 08/558,729 filed Nov. 16, 1995, U.S. Ser. No. 08/599,310 filed Feb. 9, 1996 and (unknown) filed Nov. 15, 1996 incorporated herein by reference. A manual method or some alternative automatic method, allows the connectivity of communications objects to be determined.

A new method described below also works on unmanaged objects and sets of unmanaged objects, which is novel.

The invention exploits knowledge of the detailed local topology of communicating objects.

DEFINITIONS

Communications objects such as routers have multiple communications lines. They accept frames from these lines and determine from information in each frame which line each frame should be sent out on.

Transit delay:

The time between the receipt of a frame and its dispatch out again is called the transit delay.

Drop rate:

Sometimes routing or switching communications devices cannot dispatch frames as fast as they receive them and run out of memory to store the ones they receive, so they discard some. In addition, internal queues may fill up and for other reasons, frames get lost between acceptance and onward dispatch. The overall discard rate is usually called the drop rate.

Break:

Communications devices, routing or otherwise, can break. The break state for a device is true when it can neither send nor receive on any communications line, yet all the lines are ok. For example, when a device is powered down its break state is true. The break state is true for a line when the devices at each end are not broken and yet cannot send or receive traffic across it. For example, a line is broken when it is cut through.

NMC:

The network management center is the computer which is operating the software that performs this method. It also either performs interrogation of devices to provide data for the method below or receives such data to use in the method.

The NMC periodically requests from each device in a communications network the amount of traffic flowing in and out of each interface and the line status (OK or OFF) on the line for each interface on that device. This request should result in a set of replies from each device returned to the NMC. Not all devices need report the OK or OFF line status values or do so correctly.

If a device breaks then the NMC may detect four changes. First that it now receives no replies to its requests of this device. Second that it receives no replies from devices lying beyond this device and which are only reachable through this device. Third no traffic will now be detected flowing in any lines to or from this device. Four the line status bits on lines connected to this broken device will change (e.g. from ok to off). Any subset of two or more of these four changes will be adequate to determine that the device is broken.

If a line between two devices is broken, the status bits on the interfaces at each end may change and no traffic will flow. Should neither device be broken then and yet should either of these conditions be met, then the line itself is broken. This diagnosis depends on the device break diagnosis above.

The drop rate in a device is the difference between the mean drop rate measured to devices just beyond it (and connected to it) and the mean drop rate measured to devices just before it (and connected to it), where closeness is measured in terms of the number of hops to the NMC. Devices diagnosed as broken should not be included in any part of this calculation.

The mean frame transit delay in a device is the difference between the mean round trip time measured to devices just beyond it (and connected to it) and the mean round trip time measured to devices just before it (and connected to it), where closeness is measured in terms of the number of hops to the NMC. Devices diagnosed as broken should not be included in any part of this calculation.

The result is far simpler and far more generally applicable method which gives similar or better results. This means that all the devices in communications networks can now be analyzed, without any undue burden on the network bandwidth or in machine facilities.

In accordance with an embodiment of the invention, a method for determining the mean transit delay of frames through one or more communications devices which receive and forward frames.

In accordance with another embodiment, a method for determining the mean drop rate of frames through one or more communications devices which receive and forward frames.

In accordance with another embodiment, a method for determining the break state of one or more communications devices and interfaces or lines to and from communications devices.

In accordance with another embodiment, a method of analyzing a communication network comprising determining a mean drop rate in a device x by polling each device from a network management computer (NMC) which is in communication with the network, and processing signals in the NMC to determine a drop rate D(x), in accordance with:

$$D(x)=((L+(x)-L-(x))/2,$$

$$\text{and } L(x)=1-A(x)$$

where

A(x): the fraction of poll requests from the NMC to device x for which the NMC receives replies (measured over the last M sampling periods), (wherein device x must not be broken), D(x): the mean frame drop rate in device x, L(c): NMC's perception of the loss rate to device x and back, L−(x): the NMC's perception of the mean value of L(z) for all devices z connected to device x, closer to the NMC than device x and which are not broken, and L+(x): the NMC's perception of the mean value of L(z) for all devices z connected to device x, further away from the NMC than device x and which are not broken.

In accordance with another embodiment, a method of analyzing a communication network comprising determining a mean frame transit delay in a device x by polling each device from a network management computer (NMC) which is in communication with the network and processing signals in the NMC to determine a transit delay T(x) in accordance with the process:

$$T(x)=((w+(x)-W-(x))/2$$

where

T(x): the mean frame transit delay for device x, (wherein device x must not be broken), W(x): the mean round trip time taken between a poll request from the NMC to device x and the receipt of the reply by the NMC (measured over the last N sampling periods), W−(x): The NMC's perception of the mean value of W(z) for all devices z connected to device x, closer to the NMC than device x and which are not broken, W+(x): The NMC's perception of the mean value of W(z) for all devices z connected to device x, further away from the NMC than device x and which are not broken.

In accordance with another embodiment, a method of analyzing a communication network comprising determining a break state of communications devices connected in the network, by polling each device from a network management computer (NMC) which is in communication with the network, and processing signals in the NMC in accordance with at least one of (a) (i) receiving no replies to polling signals directed to a device, (ii) receiving no replies from devices lying beyond said device, (iii) detecting no traffic flowing in any lines to or from said device, (iv) detecting changes to line status bits on lines connected to said device;

(b) (i) determining zero traffic on a line and a device being otherwise determined as not being broken, declaring the line as being broken, (ii) declaring a line as being broken in step (b)(i) after a predetermined period of time, and (c) processing steps (a) and (b) with lines having more than two ends, as if it were a single device from the point of view of breaks.

BRIEF INTRODUCTION TO THE DRAWINGS

A better understanding of the invention will be obtained by considering the detailed description below, with reference to the following drawings, in which.

DETAILED DESCRIPTION OF PREFERRED EMBODIMENTS OF THE INVENTION

The method described below is general, is independent of device type and does not require a device to respond to management requests (e.g. SNMP). Moreover, the method described below works even on objects or sets of objects not responding to management requests (e.g. a portion of the network managed by some supplier of communications services).

EXAMPLE

Figure 1:
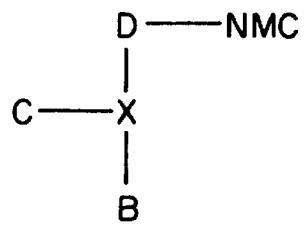
FIG. 1 is an illustration of a portion of a network.

Let a portion of a network be as in FIG. 1. 'D' lies closer to the NMC than 'x' and 'C' and 'B' lie beyond 'x'. In other words, 'D' is one hop closer to the NMC than 'x' and 'C' and 'B' are one hop beyond 'x'. Let none of the devices be broken.

The drop rate in 'x' is the difference between the mean drop rate measured to 'C' and 'B' and the mean drop rate measured to 'D'. The mean drop rate measured to 'D' is the fraction of the requests for information sent by the NMC to 'D' to which no replies have been received. The mean drop rates to 'C' and 'B' are computed similarly.

The mean frame transit delay 'x' is the difference between the mean round trip time measured to 'C' and 'B' and the mean round trip time to 'D'.

Should 'x' now break then replies will no longer be received from 'x', 'B' and 'C'. Simultaneously traffic will cease between 'D' and 'x' and the interface on 'D' for the line 'D' to 'x' will report a change from 'ok' to 'off'.

Figure 2:
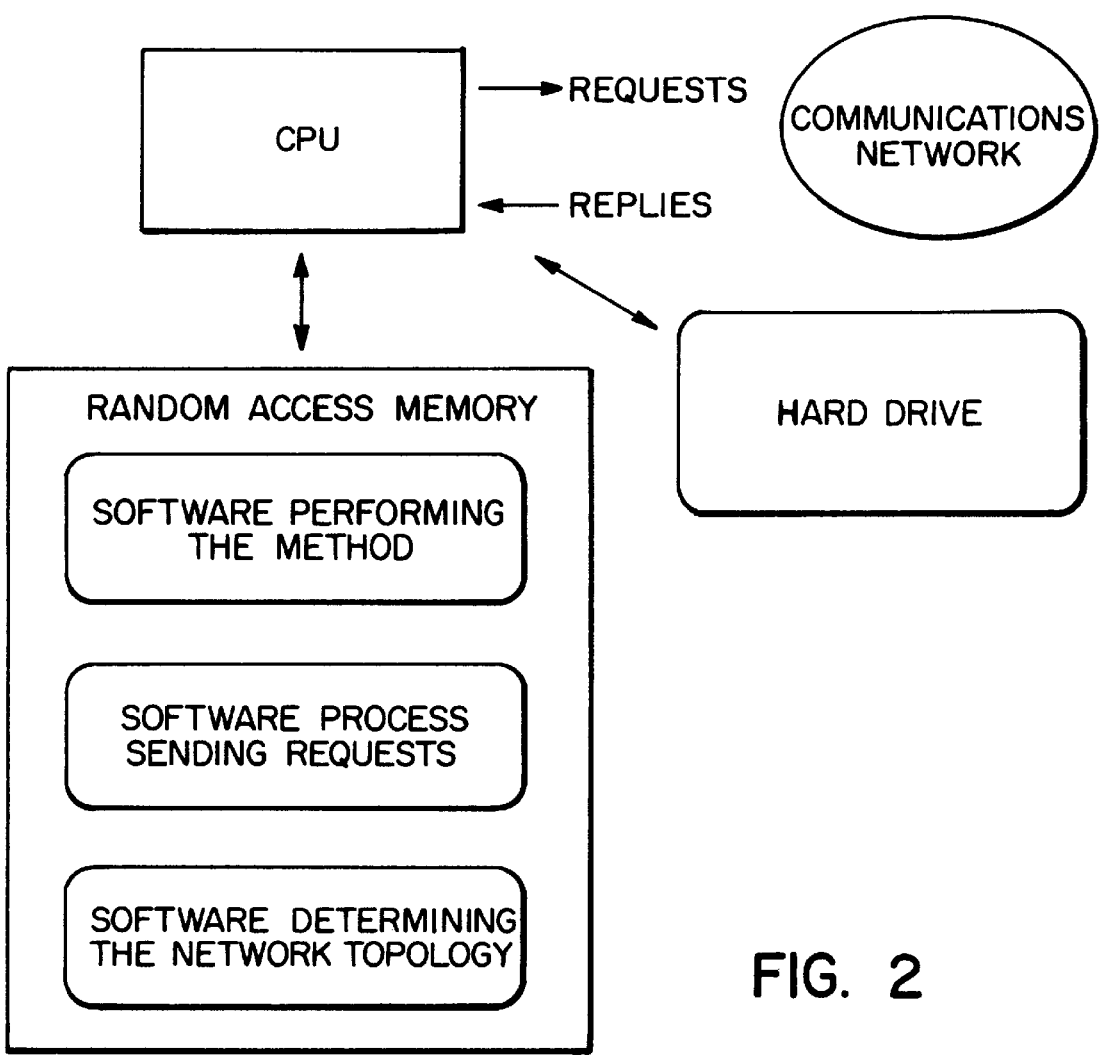
FIG. 2 is a block diagram of a structure for supplementing the invention.

The software executing the method runs as a software module within the same main software process that executes the methods described in the aforenoted patent applications. This process receives device replies from a further software process that periodically requests the traffic and status information from all managed devices in the network. The main software uses these relies to determine the topology, and once the topology is known, also passes the replies to the logic module that executes the method. Changes in break state of any object and the current drop and delay values are recorded periodically in a database. The NMC operator can now observe these changes in information by operating a software tool that examines this database. An INTEL P180 cpu with 32 MB of memory and a 1.2 Gbyte hard drive required only 0.4% of its cpu to perform real time analysis to execute this method on data recorded from every managed device every three minutes from a communications network with 3,000 communications nodes. Tests on over 10,000 simulated breaks on simulated networks of between 30 and 3,000 nodes showed no cases where the break fault method was in error. FIG. 2 describes a structure for implementing the methods described below.

To determine the drop rate of communications devices:

The mean frame drop rate is the probability that a frame will get dropped in attempting to transit through a device.

Define:

M: how many sampling periods the drop rate is averaged over (e.g. 10). A sampling period is the interval between periodic requests for traffic and status values from interfaces (e.g. 30 seconds).

A(x): the fraction of poll requests from the NMC to 'x' for which the NMC receives replies (measured over the last M sampling periods). 'x' must be not be broken.

D(x): the mean frame drop rate in device 'x'.

L(c): NMC's perception of the loss rate to 'x' and back.

L−(x): The NMC's perception of the mean value of L(z) for all devices 'z' connected to 'x', closer to the NMC than 'x' and which are not broken.

L+(x): The NMC's perception of the mean value of L(z) for all devices 'z' connected to 'x', further away from the NMC than 'x' and which are not broken.

The drop rate in a device is the difference between the mean drop rate measured to devices just beyond it (and connected to it) and the mean drop rate measured to devices just before it (and connected to it), where closeness is measured in terms of the number of hops to the NMC. Note that in equation 2 the value of D(x) is half the difference between L+ and L−, as L+ and L− refer to round trip as opposed to one way trip drops.

Therefore:

$$L(x)=1-A(x) \qquad \text{eqn 1}$$
$$D(x)=(L+(x)-L-(x))/2 \qquad \text{eqn 2}$$

Example 1

Let a portion of the network be as in FIG. 1.

Let:

A(B)=0.95 i.e. The NMC gets replies to 95% of its traffic info requests from 'B'.

A(C)=0.94 i.e. The NMC gets replies to 94% of its traffic info requests from 'C'.

A(D)=0.96 i.e. The NMC gets replies to 96% of its traffic info requests from 'D'.

Therefore:

L(B)=1−0.95=0.05
L(C)=1−0.94=0.06
L(D)=1−0.96=0.04
L−(x)=L(D)=0.04
L+(x)=(L(C)+L(B))/2=0.055
D(x)=((L(C)+L(B))/2−L(D))/2=(0.055−0.04)=0.007

Therefore the mean frame loss rate in device 'x' is 0.007.

To determine the transit delay of communication devices:

The mean frame transit delay is how long it takes the average frame to transit through this device.

Define:

M: how many sampling periods the transit delay is to be averaged over (e.g. 4) A sampling period is the interval between periodic requests for traffic and status values from interfaces (e.g. 30 seconds). T(x): the mean frame transit delay for device 'x'. 'x' must not be broken.

W(x): the mean round trip time taken between a poll request from the NMC to 'x' and the receipt of the reply by the NMC (measured over the last N sampling periods).

W−(x): The NMC's perception of the mean value of W(z) for all devices 'z' connected to 'x', closer to the NMC than 'x' and which are not broken.

W+(x): The NMC's perception of the mean value of W(z) for all devices 'z' connected to 'x', further away from the NMC than 'x' and which are not broken.

The mean frame transit delay in a device is the difference between the mean round trip time measured to devices just beyond it (and connected to it) and the mean round trip time measured to devices just before it (and connected to it), where closeness is measured in terms of the number of hops to the NMC. Note that in equation 3 the value of T(x) is half the difference between W+ and W−, as W+ and W− refer to round trip as opposed to one way trip times.

$$T(x)=(W+(x)-W-(x))/2 \qquad \text{eqn 3}$$

Example 2

Let a portion of the network be as in FIG. 1.

Let:

W(B)=0.100 i.e. The NMC gets replies from 'B' on average 0.100 seconds after it sends 'B' a request.

W(C)=0.104 i.e. The NMC gets replies from 'C' on average 0.104 seconds after it sends 'C' a request.

W(D)=0.081 i.e. The NMC gets replies from 'D' on average 0.081 seconds after it sends 'D' a request.

Therefore:

W−(x)=W(D)=0.081
W+(x)=(W(B)+W(C))/2=(0.100+0.104)/2=0.102
T(x)=(W+(x)−W(x))/2=(0.102−0.081)/2=0.010

Therefore the mean frame transit delay in device 'x' is 0.021 seconds.

To determine the break state of communications devices:

(a) Device breaks.

If a device breaks then the NMC may detect four changes. First that it now receives no replies to its requests of this device. Second that it receives no replies from devices lying beyond this device and which are only reachable through this device. Third no traffic will now detected flowing in any lines to or from this device. Fourth that the line status bits on lines connected to this broken device will change (e.g. from ok to off). Any subset of two or more of these four changes will be adequate to determine that the device is broken.

Should changes be in conflict then the presence of traffic to or from a device certainly indicates that device is not broken.

Should an interface line status be reported as OFF when traffic was flowing on a line, then that meaning of OK and OFF are considered reversed for that interface.

(b) Line breaks (2 ends).

Should a device not be broken and it reports zero traffic on a line and a change from ok to off on the interface status and the other end of the line also not be broken, then the line is declared broken. Note that this categorizes the line and the two interfaces are being a single unit from the point of view of this diagnosis.

Should a line never have traffic reported on an interface in a device and no status bit changes be detected, then the line will be considered broken after a sufficiently long period of time, should the devices at both ends not be broken.

(c) Line breaks (>2 ends)

A line which has more than two ends is treated as a device from the point of view of breaks.

Example

Let a portion of the network be as in FIG. 1.

Let device 'x' break. The NMC now will now receive no replies from 'x', 'B' or 'C'. It will also find that the traffic between 'D' and 'x' has dropped to zero.

The methods described above can be performed as a single method of partitioned into two or three methods. They can record and/or report the change or current state of the devices and interfaces under consideration to a database or file, to another software element or elements within the same cpu or not, directly or remotely to a screen or screens, to one or more NMCs, or in other ways. They can operate in a single cpu or distributed in multiple cpus. Each method can consider one or more devices, either serially or in parallel. The methods can share a common input of responses from the NMC or can have different input forms, and the methods can be integrated within a single NMC, istributed among several NMC or performed partially or wholly by other cpus.

I claim:

1. A method of analyzing a communication network comprising:

determining a mean drop rate in a device x by polling each device from a network management computer (NMC) which is in communication with the network, and processing signals in the NMC to determine a drop rate D(x), in accordance with:

$$D(x) = ((L+(x) - L-(x))/2,$$

$$\text{and } L(x) = 1 - A(x)$$

where

A(x): the fraction of poll requests from the NMC to device x for which the NMC receives replies (measured over the last M sampling periods), (wherein x must not be broken), D(x): the mean frame drop rate in device x, L(c): NMC's perception of the loss rate to device x and back, L-(x): the NMC's perception of the mean value of L(z) for all devices z connected to device x, closer to the NMC than device x and which are not broken, and L+(x): the NMC's perception of the mean value of L(z) for all devices z connected to device x, further away from the NMC than device x and which are not broken.

2. A method of analyzing a communication network comprising determining a mean frame transit delay in a device x by polling each device from a network management computer (NMC) which is in communication with the network and processing signals in the NMC to determine a transit delay T(x) in accordance with the process:

$$T(x) = ((w+(x) - W-(x))/2$$

where

T(x): the mean frame transit delay for device x, (wherein device x must not be broken), W(x): the mean round trip time taken between a poll request from the NMC to device x and the receipt of the reply by the NMC (measured over the last N sampling periods), W-(x): The NMC's perception of the mean value of W(z) for all devices z connected to device x, closer to the NMC than device x and which are not broken, W+(x): The NMC's perception of the mean value of W(z) for all devices z connected to device x, further away from the NMC than device x and which are not broken.

3. A method of analyzing a communication network comprising determining a break state of communications devices connected in the network, by polling each device from a network management computer (NMC) which is in communication with the network, and processing signals in the NMC in accordance with at least one of (a) (i) receiving no replies to polling signals directed to a device,
       (ii) receiving no replies from devices lying beyond said device,
       (iii) detecting no traffic flowing in any lines to or from said device,
       (iv) detecting changes to line status bits on lines connected to said device;

(b) (i) determining zero traffic on a line and a device being otherwise determined as not being broken, declaring the line as being broken,
       (ii) declaring a line as being broken in step (b)(i) after a predetermined period of time, and (c) processing steps (a) and (b) with lines having more than two ends, as if it were a single device from the point of view of breaks.

* * * * *